Feb. 5, 1952   B. E. DE LAMATER, SR   2,584,262
ROTARY CUTTER
Filed Nov. 15, 1949
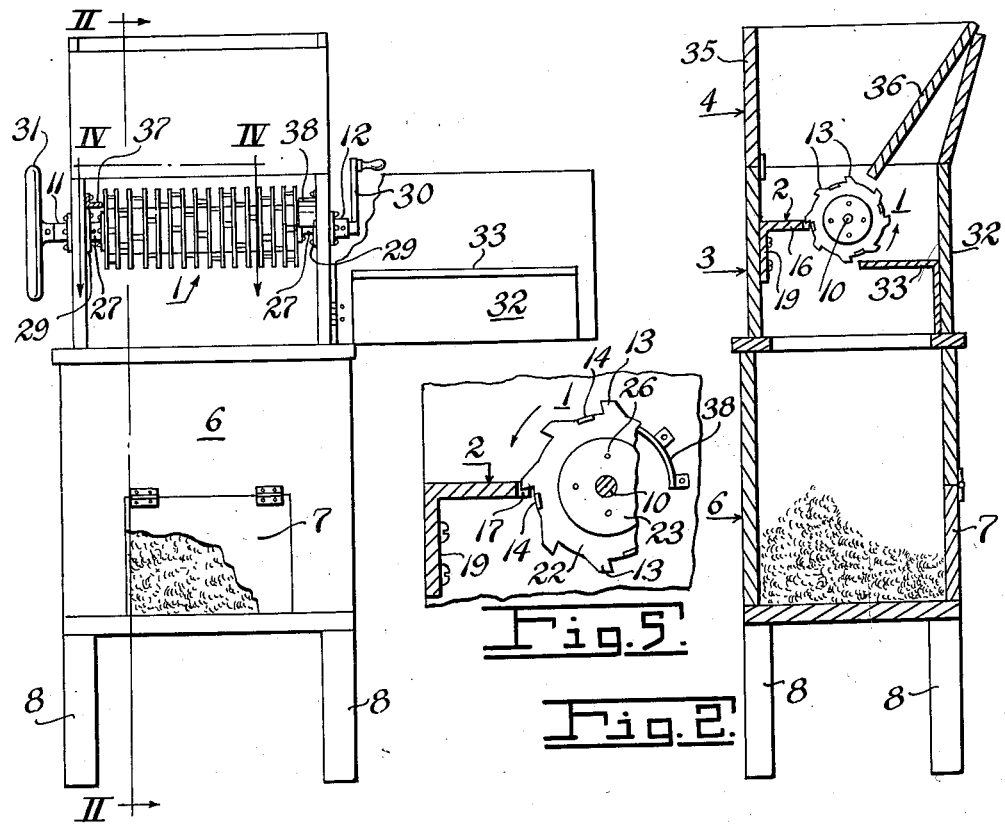
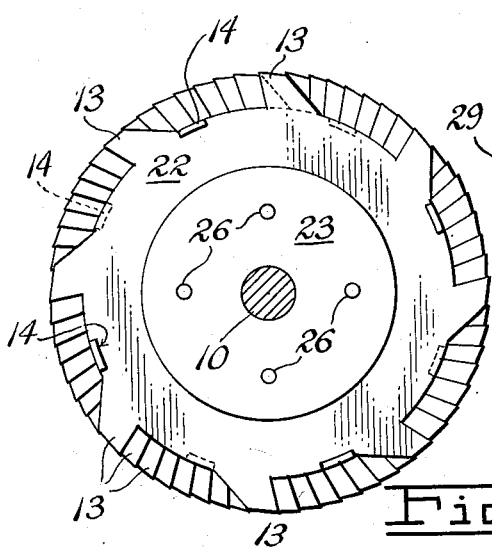
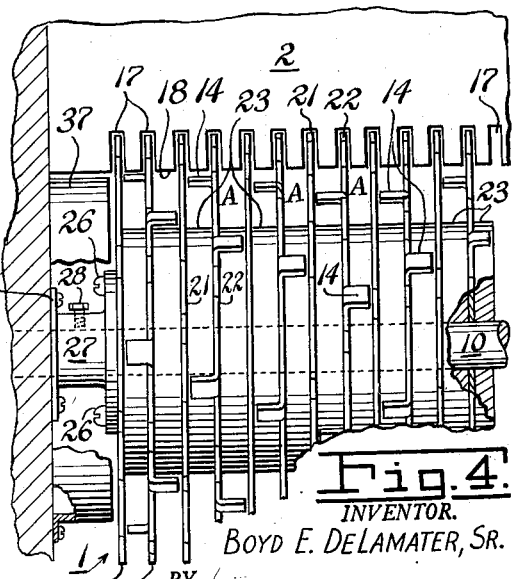
INVENTOR.
BOYD E. DE LAMATER, SR.
BY Zugelter & Zugelter
Attys.

Patented Feb. 5, 1952

2,584,262

UNITED STATES PATENT OFFICE 2,584,262

ROTARY CUTTER

Boyd E. De Lamater, Sr., Cincinnati, Ohio

Application November 15, 1949, Serial No. 127,406

5 Claims. (Cl. 146—123)

This invention relates to cutters for comminuting leaves and other vegetable matter and more particularly to cutters comprising rotary cutter and a stationary cutter bar that is particularly adapted for cutting leaves, grass and similar vegetable matter into relatively fine particles for use in composts and as a fertilizing and soil building agent.

An object of this invention is to provide a cutter for comminuting vegetable matter and the like that comprises a stationary cutter bar having spaced slots in the cutting edge thereof and a rotary cutter having a plurality of spaced circumferential rows of radial teeth adapted to pass through the slots in the cutter bar, and a plurality of segmental cylindrical teeth extending laterally of the radial teeth and adapted to co-act with the portions of the cutter bar edge between the slots therein to effect further cutting of the vegetable matter.

Another object of the invention is to provide a rotary cutter that comprises a plurality of spaced disks mounted on a shaft, alternate disks of which are provided with radial teeth, the intervening disks being provided with both radial and segmental cylindrical teeth, the cylindrical teeth bridging the spaces between pairs of radial tooth disks and being located radially inward of the radial teeth a distance sufficient to permit the segmental cylindrical teeth to pass the edge portions of the bar located between the slots thereof in cutting relationship therewith.

A further object of the invention is to provide a rotary cutter such as set forth above in which the disks are offset from the opposite ends of the cutter towards the center thereof so that the radial teeth form a V pattern with the base of the V located substantially at the middle of the cutter.

The above and other objects of the invention will be apparent from the following description taken in conjunction with the accompanying drawings in which:

Figure 1 is a view in front elevation of a device for cutting or comminuting leaves and other vegetable matter, the device embodying a rotary cutter and stationary cutter bar arranged and constructed in accordance with an embodiment of the invention;

Fig. 2 is a view in section taken on line II—II of Fig. 1;

Fig. 3 is an end view of the rotary cutter, the shaft being in section;

Fig. 4 is a fragmentary top plan view of the cutter and the housing therefor, taken on line IV—IV of Fig. 3, parts being in section; and Fig. 5 is an enlarged view of the rotary cutter and the stationary cutter bar shown in Fig. 2.

Throughout the drawings and the specification like reference characters indicate like parts.

The invention illustrated in the drawings comprises a rotary cutter 1 and a stationary cutter bar or blade 2 mounted in a housing 3. In order that leaves or other vegetable matter may be fed to the cutter, a hopper 4 is provided and mounted on housing 3 as shown. If desired the cutter housing may be mounted on a bin or collector 6 into which the cut or chopped vegetable matter may be discharged from the cutter and collected. The chopped leaves or vegetable matter may, if desired, be collected in a box or the like, placed in collector 6 through a door 7, to facilitate removal of the material from the bin and transporting the same to whatever location the comminuted material is to be used. Also the bin may be provided with legs 8 so that the bin, cutter housing and hopper may be supported off the ground or floor to suit the convenience of the user.

The rotary cutter is generally cylindrical in shape and mounted on a shaft 10 journalled in bearings 11 and 12 secured to opposite sides of the housing 3. The cutter is provided with a plurality of annular, spaced, parallel rows of radial teeth 13 and a plurality of segmental cylindrical teeth 14 projecting laterally from and disposed radially inward of the tips of the radial teeth. Hereinafter the term "cylindrical teeth" will be used in lieu of the longer term "segmental cylindrical teeth."

The stationary cutter 2 includes a cutter bar 16 extending lengthwise of and parallel to the shaft of the rotary cutter. This cutter bar 16 is provided with a plurality of spaced slots 17 through which the radial teeth of the rotary cutter pass when the cutter is rotated on its shaft. The cylindrical teeth 14 are located inwardly of the tips of the radial teeth a distance sufficient to cause the forward edges thereof to pass the edge 18 of the cutter bar at the locations between the slots 17 in cutting relation thereto.

The stationary cutter bar may be made from a piece of angle iron as shown in Figs. 2 and 5. The vertical leg 19 of the angle iron may be secured to the back wall of the cutter housing at such an elevation that the cutter bar 16 thereof is in a plane passing through the longitudinal axis of the shaft of the rotary cutter.

The teeth of rotary cutter are formed on a plurality of spaced and alternately arranged disks 21 and 22 each having spaced radial teeth 13, the disks being spaced apart by spacers 23.

As shown in the drawings, the disks 21 at each end of the cutter assembly have only the radial teeth, while disks 22 have both radial and cylindrical teeth 13 and 14, respectively. As shown, a cylindrical tooth is located between each pair of radial teeth, and these teeth project laterally from the disks, the teeth projecting alternately in opposite directions. The lengths of the cylindrical teeth are such that the ends thereof touch, or substantially touch, the adjacent disks having only radial teeth 13.

I prefer to so mount the disks 21 and 22 on the shaft that the teeth of one disk are offset with respect to the teeth of the adjacent and subsequent disks. For example, if the disk at the left hand end of the cutter is considered as the reference disk, the next adjacent disk is offset a predetermined amount, said 5°, in a clockwise direction, the next and following disks are likewise offset the same amount with reference to each other until the total angle of offset is about 45°. From the middle to the right hand end of the rotary cutter the direction of offset of the disks is reversed so that when the end disk at the right hand end of the rotary cutter is reached the teeth of that disk will occupy the same angular position as the teeth of the disk at the left hand end of the cutter. When the offset of the disks is so arrangd, the teeth of the disks form a V-shaped pattern, the base of which is approximately at the middle of the cutter.

I prefer to assemble the disks 21 and 22 and the spacers 23 as a unit on a plurality of through bolts 26 disposed 90° apart as shown in Fig. 3. Holes are punched in the disks and the spacers to accommodate the through bolts. If the holes in the disks are punched at angles corresponding to 0°, 90°, 180° and 270° respectively, and if the disk immediately adjacent disk 21 and the left hand end of the cutter is rotated 5° before the through bolt holes are punched, and the following disks are each rotated 5° clockwise with respect to each other before the through bolt holes are punched it follows that the radial teeth of adjacent disks will be offset 5° with respect to each other. When a disk has been offset 45°, which is approximately the angle between the radial teeth, I then reverse the direction of offset by offsetting the disks in a counter-clockwise direction, starting at 45° and working back to the starting point. Thus the teeth in the disks in the left hand half of the cutter will be offset clockwise an angle of 5° with respect to each other, and the teeth in the group of disks in the right hand half of the cutter will be offset 5° with respect to each other counter-clockwise, the teeth thus forming a V-shaped or herringbone pattern.

At each end of the rotating cutter I provide a flanged bushing 27 through which the through bolts 26 extend. These bushings are of a size to accommodate the shaft. The disks and spacers are also provided with center holes that line up with the bushings to accommodate the rotor shaft. A set screw 28 may be used with either or both bushings to secure the assembled disks and spacers to the shaft. The ends of the bushings are arranged to abut wear plates 29 on the side walls of the housing. The rotary cutter may be turned by hand by means of a crank 30 attached to one end of the rotor shaft or by a motor (not shown). I may also use a flywheel 31 as indicated to make operation of the cutter steady and smooth.

As shown in Figs. 1 and 2, the front wall 32 of housing 3 is hinged as a door so that access may be had to the rotary cutter for inspection, repairs, or to remove lodged material from the cutter. On the door 32 a shelf like guard 33 may be mounted that extends to a point under and close to the rotary cutter when the door is closed. This bracket helps to keep the cutter free of material that might be carried along in the cutter teeth. The hopper 4 may be made removable or as a fixed part of the cutter housing 3. As shown, the hopper is formed by an upward extension 35 of the back wall of the cutter housing and by a three-sided unit which can be removed as and when necessary. Within the sides and the front wall of the hopper a sloping wall or partition 36 is secured which acts to feed the material to be cut towards the space between the top of the rotary cutter and the stationary cutter.

Between the ends of the rotary cutter and the side walls of the housing therefor, I provide arcuate bridges 37 and 38 for closing the spaces between the side walls and the ends of the cutter, thereby preventing leaves or other vegetable matter being fed to the cutter from falling through into the bin without first passing through the cutter. The arcuate bridges extend from the cutter bar 16 rearwardly and upwardly to a point diametrically opposite the cutter shaft 10 as shown in Fig. 5.

When the rotary cutter is used, the shaft is turned in the direction shown by the arrows in Figs. 2 and 5. If leaves or other vegetable matter are placed in the hopper while the rotary cutter is turning as indicated, the radial teeth pull the leaves down on the stationary cutter bar and slice through them as the teeth pass through the slots 17. The cylindrical teeth and the cutter bar edge 18 shear the leaves lying between the radial teeth. Thus, the rotary cutter and the stationary cutter bar cut in two directions, that is, radially and laterally with respect to the cutter teeth. Leaves and the like are thereby cut into small rectangular pieces which pack down to a relatively small volume. For example, if I pass a packed bushel of leaves through the cutter the volume of the chopped leaves would be less than half the original volume. The chopped leaves and the like collect in the spaces A of the rotary cutter from which they are discharged when these spaces are on the underside of the stationary cutter bar. The diameter and thickness of the spacers 23 determine the volume of spaces A. In practice I control these volumes by the size of the spacers employed.

From the foregoing it will be apparent that I may modify the shape of both the radial and cylindrical teeth of the rotary cutter and that the number of teeth per disk may be varied as desired. It will also be understood that the housing in which the rotary cutter and the stationary cutter are mounted, the hopper and the bin, may be designed to fit particular needs, and need not be constructed as illustrated.

Having thus described the invention it will be apparent to those skilled in this art that various modifications and changes may be made in the illustrated embodiment of the invention without departing from either the spirit or the scope of the invention.

Therefore, what I claim as new and desire to secure by Letters Patent is:

1. Apparatus for comminuting vegetable matter such as leaves, grass and the like, comprising a housing having therein a stationary cutter bar provided with spaced parallel slots in and disposed at substantially a right angle to the cutting edge thereof and a rotary cutter, said rotary cutter comprising a shaft, a plurality of spaced parallel disks secured to said shaft and having their centers co-axial with the axis of rotation of the cutter, each of said disks having radial teeth uniformly spaced about the circumferential edge thereof and disposed to pass through a cutter bar slot, and certain of said disks having integral segmental cylindrical teeth projecting laterally therefrom towards the adjacent disks, said segmental cylindrical teeth being located radially inward of their respective disks a distance corresponding to the radial distance between the tips of the teeth to the cutting edge of said cutter bar, the cutter bar being in a plane passing approximately through the axis of rotation of the rotary cutter, the cutting edge of said cutter bar being parallel to the axis of rotation of the rotary cutter and substantially tangent to a cylinder containing the outermost surfaces of said segmental cylindrical teeth.

2. Apparatus according to claim 1 characterized by the fact that alternate disks of the rotary cutter have spaced radial teeth, and that intervening disks have radial teeth and segmental cylindrical teeth interposed between the radial teeth thereof, the cylindrical teeth being substantially concentric with the axis of rotation of said cutter.

3. Apparatus according to claim 1 characterized by the fact that the disks are so positioned that the radial teeth are offset one from another in progression from each end of the cutter towards the middle portion thereof and that the segmental cylindrical teeth of the disks form substantially a V-pattern.

4. A rotary cutter according to claim 1 characterized by the fact that the segmental cylindrical teeth substantially bridge the space between its integral disk and its adjacent disk.

5. A rotary cutter according to claim 1 characterized by the fact that spacers are disposed between adjacent disks, that bolts extend through said disks and spacers to clamp the disks and spacers firmly together, and that means are provided at the ends of said rotary cutter for securing the assembly of disks and spacers to said shaft.

BOYD E. DE LAMATER, Sr.

REFERENCES CITED

The following references are of record in the file of this patent:

UNITED STATES PATENTS

| Number | Name | Date |
|---|---|---|
| 135,370 | Sauge | Jan. 28, 1873 |
| 570,828 | Tracy | Nov. 3, 1896 |
| 578,250 | Holland | Mar. 2, 1897 |
| 692,601 | Berger | Feb. 4, 1902 |
| 747,905 | Curtiss | Dec. 22, 1903 |
| 851,321 | Scheward | Apr. 23, 1907 |
| 1,061,401 | Penn | May 13, 1913 |
| 2,250,651 | Pickens | July 29, 1941 |

FOREIGN PATENTS

| Number | Country | Date |
|---|---|---|
| 804,117 | France | Oct. 16, 1936 |
| 546,680 | Great Britain | July 24, 1942 |